June 18, 1968 NAOJI TAMURA 3,388,844

PINCH ROLLER OPERATING DEVICE FOR MAGNETIC TAPE RECORDERS

Filed Oct. 20, 1965 7 Sheets-Sheet 1

INVENTOR.
Naoji Tamura

BY Hill, Sherman, Meroni, Gross & Simpson
ATTORNEYS

June 18, 1968 NAOJI TAMURA 3,388,844

PINCH ROLLER OPERATING DEVICE FOR MAGNETIC TAPE RECORDERS

Filed Oct. 20, 1965 7 Sheets-Sheet 2

INVENTOR.
Naoji Tamura

BY Hill, Sherman, Meroni, Gross & Simpson ATTORNEYS

June 18, 1968 NAOJI TAMURA 3,388,844

PINCH ROLLER OPERATING DEVICE FOR MAGNETIC TAPE RECORDERS

Filed Oct. 20, 1965 7 Sheets-Sheet 3

INVENTOR.
Naoji Tamura

BY Hill, Sherman, Meroni, Gross & Simpson ATTORNEYS

June 18, 1968 NAOJI TAMURA 3,388,844

PINCH ROLLER OPERATING DEVICE FOR MAGNETIC TAPE RECORDERS

Filed Oct. 20, 1965 7 Sheets-Sheet 4

INVENTOR.
Naoji Tamura

BY Hall, Sherman, Meroni, Gross & Simpson ATTORNEYS

INVENTOR.
Naoji Tamura
BY Hill, Sherman, Meroni, Gross & Simpson ATTORNEYS

June 18, 1968 NAOJI TAMURA 3,388,844

PINCH ROLLER OPERATING DEVICE FOR MAGNETIC TAPE RECORDERS

Filed Oct. 20, 1965 7 Sheets-Sheet 6

INVENTOR.
Naoji Tamura

BY Hill, Sherman, Meroni, Gross & Simpson ATTORNEYS

June 18, 1968 NAOJI TAMURA 3,388,844

PINCH ROLLER OPERATING DEVICE FOR MAGNETIC TAPE RECORDERS

Filed Oct. 20, 1965 7 Sheets-Sheet 7

INVENTOR.
Naoji Tamura

BY Hill, Sherman, Meroni, Gross & Simpson ATTORNEYS

United States Patent Office 3,388,844
Patented June 18, 1968

3,388,844
PINCH ROLLER OPERATING DEVICE FOR MAGNETIC TAPE RECORDERS

Naoji Tamura, Tokyo, Japan, assignor to Kabushikikaisha Taiko Denki Seisakusho (Taiko Electric Works Ltd.), Tokyo, Japan, a corporation of Japan
Filed Oct. 20, 1965, Ser. No. 498,697
Claims priority, application Japan, Nov. 4, 1964, 39/86,160
6 Claims. (Cl. 226—90)

ABSTRACT OF THE DISCLOSURE

A mechanical pinch roller operating device for a magazine-type magnetic tape recorder and player in which a hand rotatable knob is connected to a pinch roller. The pinch roller is raised or lowered to engage with or disengage from a capstan in accordance with hand rotation of the knob. The pinch roller is also raised into the engaged position with the capstan in response to the loading movement of the magazine. An adjusting screw is provided for changing the contact pressure of the pinch roller against the capstan.

This invention relates to a pinch roller operating device for magnetic tape recorders, in particular for magazine- or cartridge-type magnetic tape recorders and players.

One object of this invention is to provide a mechanical automatic pinch roller operating device for magazine-type magnetic tape recorders in which one end of a mechanical actuating shaft having the other end associated or interlocked with a pinch roller cooperating with a capstan projects out of the front panel of the recorder, a knob being mounted on the projecting end and disposed on the front panel together with knobs for the electric amplifier, a volume control and so on, and the pinch roller is engaged with or disengaged from the capstan by turning the knob of the actuating shaft.

Another object of this invention is to provide a pinch roller operating device for magazine-type magnetic tape recorders in which when a tape magazine is loaded a pinch roller is raised into the engaged position with a capstan in response to the movement of the magazine to automatically press a magnetic tape against the capstan, thus providing the recorder with proper operative position under this condition.

Still another object of this invention is to provide a pinch roller operating device for magazine-type magnetic tape recorders in which the contact pressure of a magnetic tape against a capstan by the pinch roller can easily be adjusted.

Other objects, features and advantages of this invention will be apparent from the following description taken in conjunction with the accompanying drawings, in which.

Figure 1:
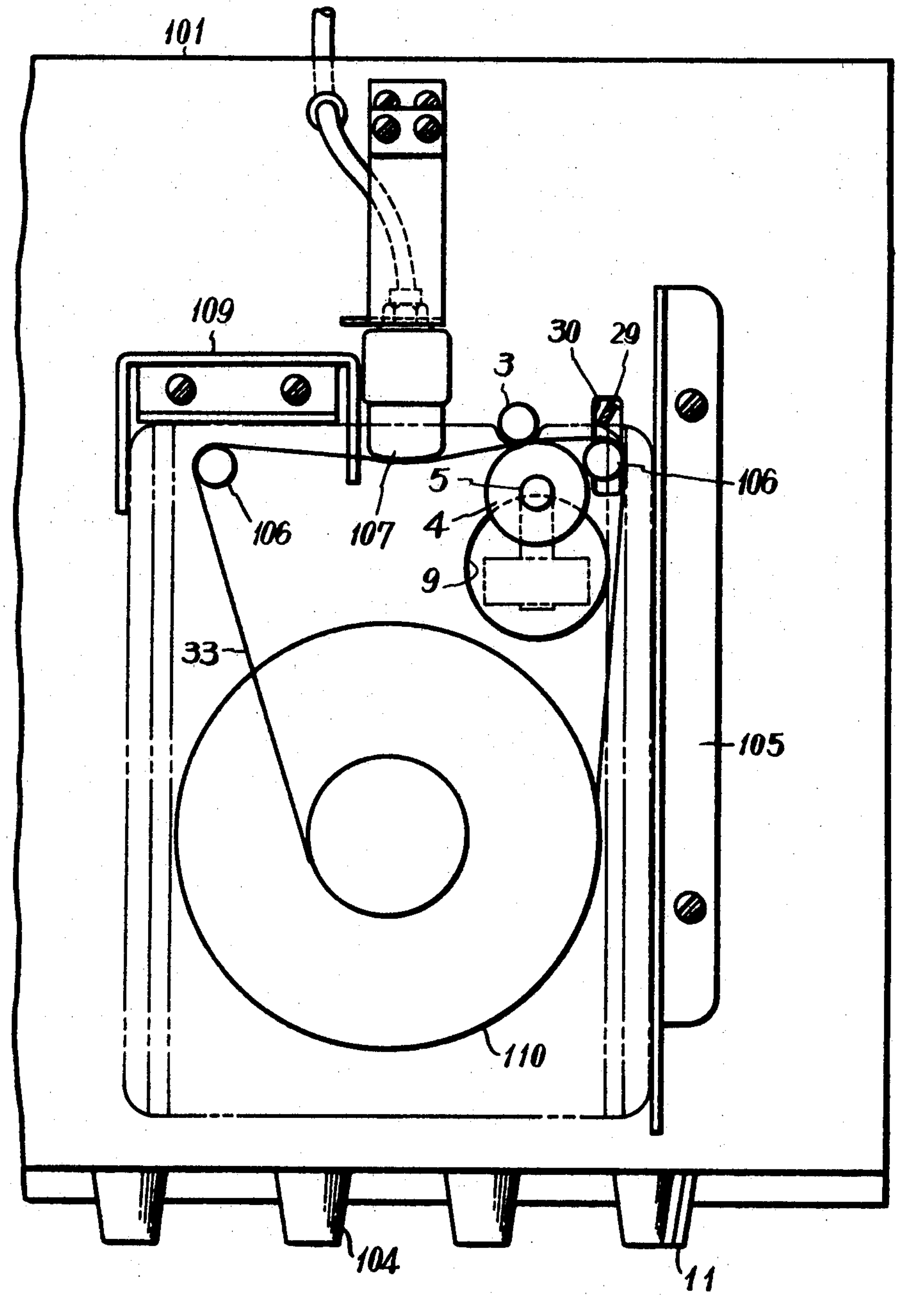
FIGURE 1 is a diagrammatic plan view of one part of the magazine-type magnetic tape recorder illustrating an example of the relative arrangement of its magnetic head, capstan, pinch roller, magazine and so on, having its cover removed.
Figure 2:
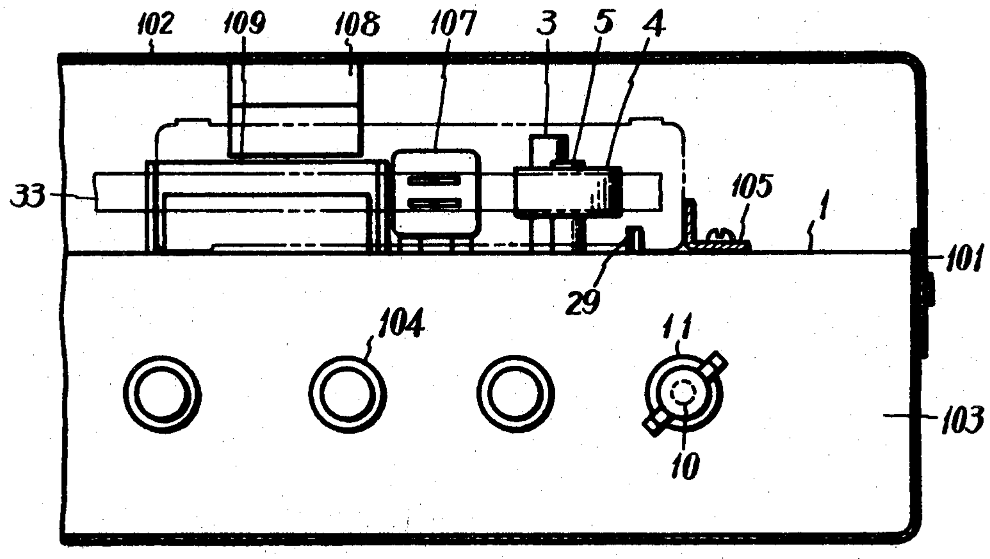
FIGURE 2 is its front view.

Referring to the drawings, the present invention will hereinafter be explained. In FIGURES 1 to 3, 101 is a case of a recorder, 102 is a cover and 103 is a front panel, on which panel are arranged electric adjusting knobs such as a volume control knob 104 and so on. According to this invention, a pinch roller operating knob 11 is provided side by side with such knobs for electric circuit control on the front panel 103, and a pinch roller 4 is engaged with and disengaged from a capstan 3 through an operating mechanism described later. 13 is a magazine provided with a reel 110, which is guided by a magazine guide 105 into the case to abut against a stopper 109. The magnetic tape 33 is taken up from inside of the reel 110 and guided by guide rollers 106 and driven in contact with a magnetic head 107, being gripped between the capstan 3 and the pinch roller 4 as usual. 108 is a support wire for pressing the magazine 13.

Figure 4:
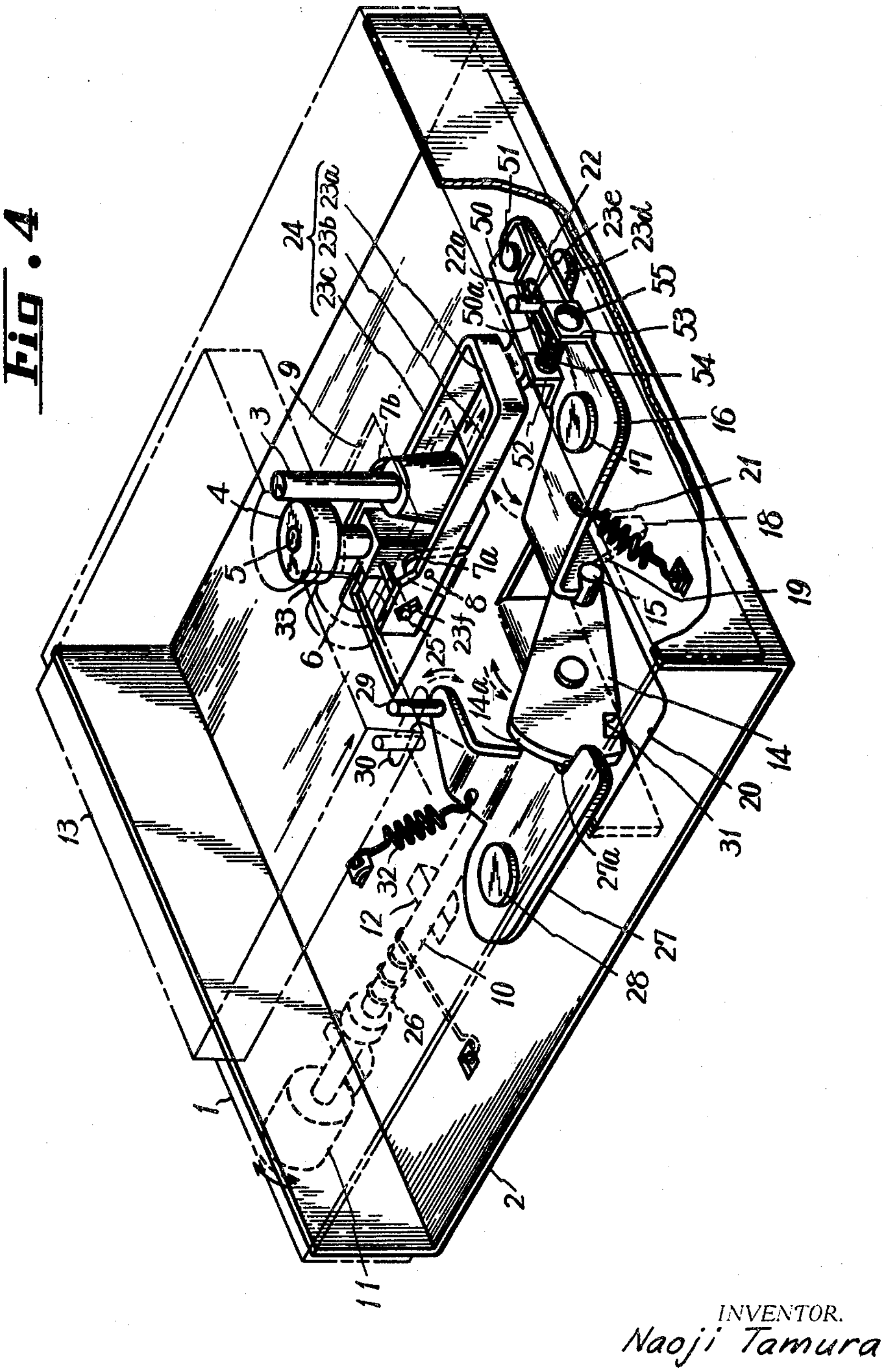
FIGURE 4 is a perspective view illustrating an example of the pinch roller operating device for magazine-type magnetic tape recorders.
Figure 6:
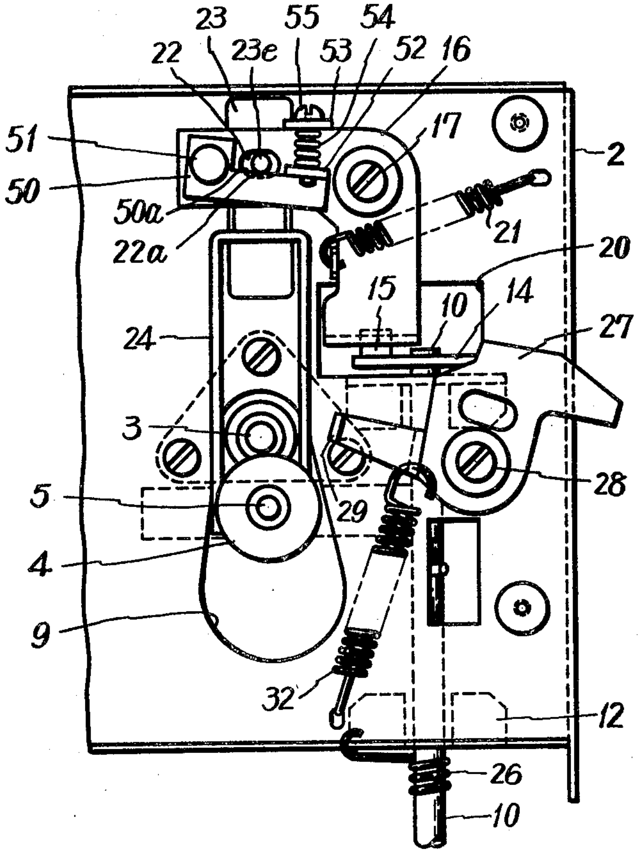
FIGURE 6 is a plan view of one part of the device shown in FIGURE 1.

With reference to FIGURE 4, an example of the device of this invention will be explained in detail. 2 is a chassis, which is secured to the underside of the upper panel 1, being spaced therefrom a certain distance. The capstan 3 is mounted rotatably on the chassis 2, with its upper end extending through the panel 1. To its lower end is fixed, for example, a flywheel (not shown in the drawing) to drive the capstan 3 by a motor (also not illustrated). 4 is a pinch roller, 5 is its rotary shaft and 6 is its support stud. The support stud 6 is hinged about a pin 8 fixed to a pair of confronting lugs 7*a* and 7*b* formed integrally with the chassis 2, for example. That is, the pinch roller 4 is engaged with or disengaged from the capstan 3 according as the support stud 6 stands upright or lies flat. 9 is a hole made on the upper panel 1, from which the capstan 3 and the pinch roller 4 protrude. 10 is a rotary actuating shaft, which is mounted rotatably on the underside of the chassis 2, its one end protruding out from the front panel and a knob 11 being mounted thereon, as is illustrated in FIGURE 4. 12 is means for rotatably mounting the shaft 10 on the chassis 2. 13 is a tape magazine, which is loaded in the recorder by pushing it in the direction of the arrow along the upper side of the panel 1.

In accordance with this invention the pinch roller 4 is engaged with or disengaged from the capstan 3 by turning the knob 11, namely the rotary actuating shaft 10 in the clockwise or anticlockwise direction. To perform this, in FIGURE 4 a rotary arm 14 is secured to the free end of the rotary shaft 10 and a pin 15 is mounted on one free end of the arm 14. For changing the direction of power transmission, a substantially L-shaped lever 16 is provided, which is secured rotatably to the chassis 2 at its bent portion by means of a pin 17. One free end of the lever 16 is bent downwards and one side margin of the bent portion 18 is formed to be a taper 19 for the aforementioned pin 15 to engage. 20 is a window made in the chassis 2, through which the bent portion 18 of the lever 16 extends out to the underside of the chassis 2. 21 is a spring, which biases the lever 16 so that the taper 19 may normally abut against the pin 15. The lever 16 is provided with a long and narrow groove 22 at its other free end.

As illustrated in the drawings, a fork-shaped operating rod 24 is provided which consists of a center piece 23*a*, arms 23*b* and 23*c* and a projection 23*d* extending in the opposite direction, the projection 23*d* having planted thereon a pin 23*e* and the arms 23*b* and 23*c* each having a groove 23*f* on its free end. Then, a pin 25 planted on the support stud 6 substantially in parallel to the pin 8 is engaged with the grooves 23*f* of the fork-shaped operating rod 24 and the pin 23*e* on the projection 23*d* is also engaged with the groove 22 of the lever 16. In this case, it is as illustrated in the drawings that the arms 23_b_ and 23_c_ extend in the planes parallel to the rotational plane of the support stud 6.

With such an arrangement as described above, where the knob 11 is turned in the counter-clockwise direction as shown by the arrow in the solid lines, the rotary arm 14 and the lever 16 respectively turn in the directions of the arrows in the full lines, and hence the operating rod 24 is pushed in the forward direction shown by the arrow in the full lines with the result that the pinch roller 4 carried by the support stud 6 is turned about the pin 8 and locked in the disengaged position shown by the dotted lines. Under such conditions, when the knob 11 is turned in the clockwise direction as shown by the broken line arrow, movements of the respective parts are carried out in the opposite directions to those in the above described disengaging operation. That is, the rotary arm 14 and the lever 16 turn in the directions of the dotted line arrows thereby to pull the operating rod 24 in the backward direction shown by the broken line arrow, and the support stud 6 is pulled up to engage the pinch roller 4 with the capstan 3, with the magnetic tape 33 gripped therebetween. The recorder or player is thus arranged so as to be operative under this condition. The contact pressure of the pinch roller 4 against the capstan 3 is produced by a biasing force that a spring 26 wound on, for example, the actuating shaft 10, having one end fixed to the shaft 10 and the other end fixed to the chassis 2, permanently rotates the shaft 10 in the direction of the broken line arrow, as illustrated. Therefore, the force of the return spring 26 for rotating the lever 16 is greater than that of the spring 21 for the lever 16.

In the example illustrated in FIGURE 4, a rotary lever 27 is further provided, which is mounted on the chassis 2 by a pin 28. On the rotary lever 27 is planted a pin 29, the top end of which is made to extend upwards from the upper panel 1 through an aperture 30. A recess 31 is formed on one side margin of the rotary arm 14. That is, the pinch roller is locked in its disengaged position from the capstan 3 by engaging one side margin 27_a_ of the lever 27 with the recess 31 of the arm 14. 32 is a bias spring which pulls the lever 27 in such a direction as to cause its marginal edge 27_a_ to engage with the recess portion 31 of the arm 14.

Loading the magazine 13 in the recorder by pushing it in the direction of the arrow along the upper panel 1 when the margin 27_a_ of the lever 27 is maintained in the recess 31 of the arm 14, the rear end of the magazine 13 pushes the pin 29 in the direction of the broken line arrow, releasing the lever 27 from the recess 31 of the arm 14. As a result of this, the arm 14 is turned by the return spring 26 in the direction of the arrow of the dotted line and the pinch roller 4 is automatically engaged with the capstan 3 as has been described in the foregoing. Under this condition the recorder can be put in motion immediately, having the magnetic tape 33 gripped between the capstan 3 and the pinch roller 4 as illustrated in FIGURE 4. Furthermore, by suitably selecting the angle of the circular arc 14_a_ of the arm 14 with respect to the shaft 10, the pinch roller 4 is disengaged from the capstan 3 almost completely by turning the knob 11 in the direction of the solid line arrow and then the lever 27 is turned by the bias spring 32 in the direction shown by the arrow of the full line. As a result of this, the magazine 13 is pushed out a little from the recorder by the pin 29 due to the force of the bias spring 32, with the magnetic tape 33 being not gripped between the pinch roller 4 and the capstan 3. Accordingly, the magazine 13 can easily be unloaded from the recorder.

Figure 5:
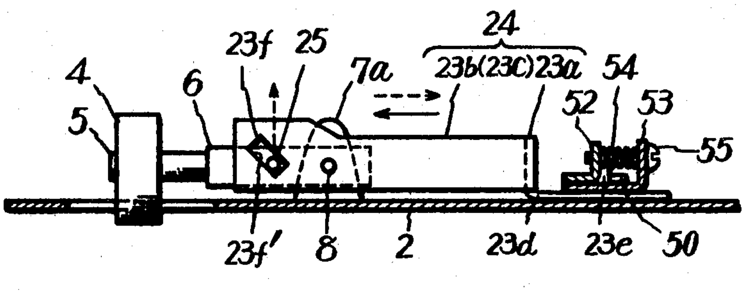
FIGURE 5 is a cross-sectional view of one part thereof.
Figure 3:
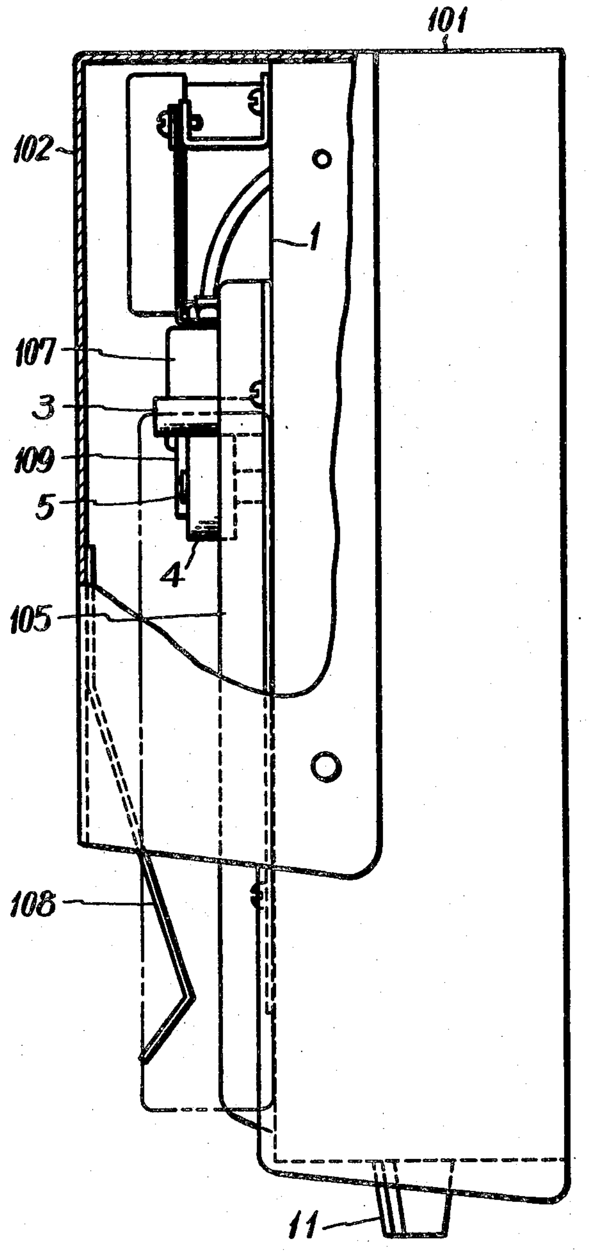
FIGURE 3 is its side view.

The grooves 23_f_ formed in the arms 23_b_ and 23_c_ of the operating rod 24 extend obliquely to the direction of transfer of the operating rod 24 as illustrated in FIGURE 5. When the operating rod 24 is pulled in the direction of the dotted line arrow, the pin 25 is pushed up by one inner side edge 23_f'_ of the groove 23_f_, causing the support stud 6 to come up to contact position.

Furthermore, in the present invention, there is provided a mechanism for adjusting the contact pressure of the pinch roller 4 against the capstan 3. That is, a pressure lever 50 is provided along the inner side margin 22_a_ of the groove 22 of the lever 16. Then, one end of the lever 50 is pivoted to the lever 16 at a point 51 and the other end is provided with a projection 52. A pressure-adjusting spring 54 is stretched between the projection 52 and a confronting projection 53 formed on the lever 16 and an adjusting screw 55 is provided on the projection 53. By adjusting the screw 55, the force of the pressure spring 54 is controlled. To this end, the outer edge 50_a_ of the lever 50 is located further to the outside than the inner margin 22_a_, namely the edge 50_a_ extends out into the groove 22 and makes contact with the pin 23_e_, thereby suitably pulling and biasing the operating rod 24 outwards in advance. Therefore, it is possible to increase the contact pressure of the pinch roller 4 against the capstan 3 when the former is raised into contact with the latter. With such an arrangement, the pressure of the pinch roller to the capstan can be controlled as desired in accordance with the pressure of the screw 54.

Figure 7:
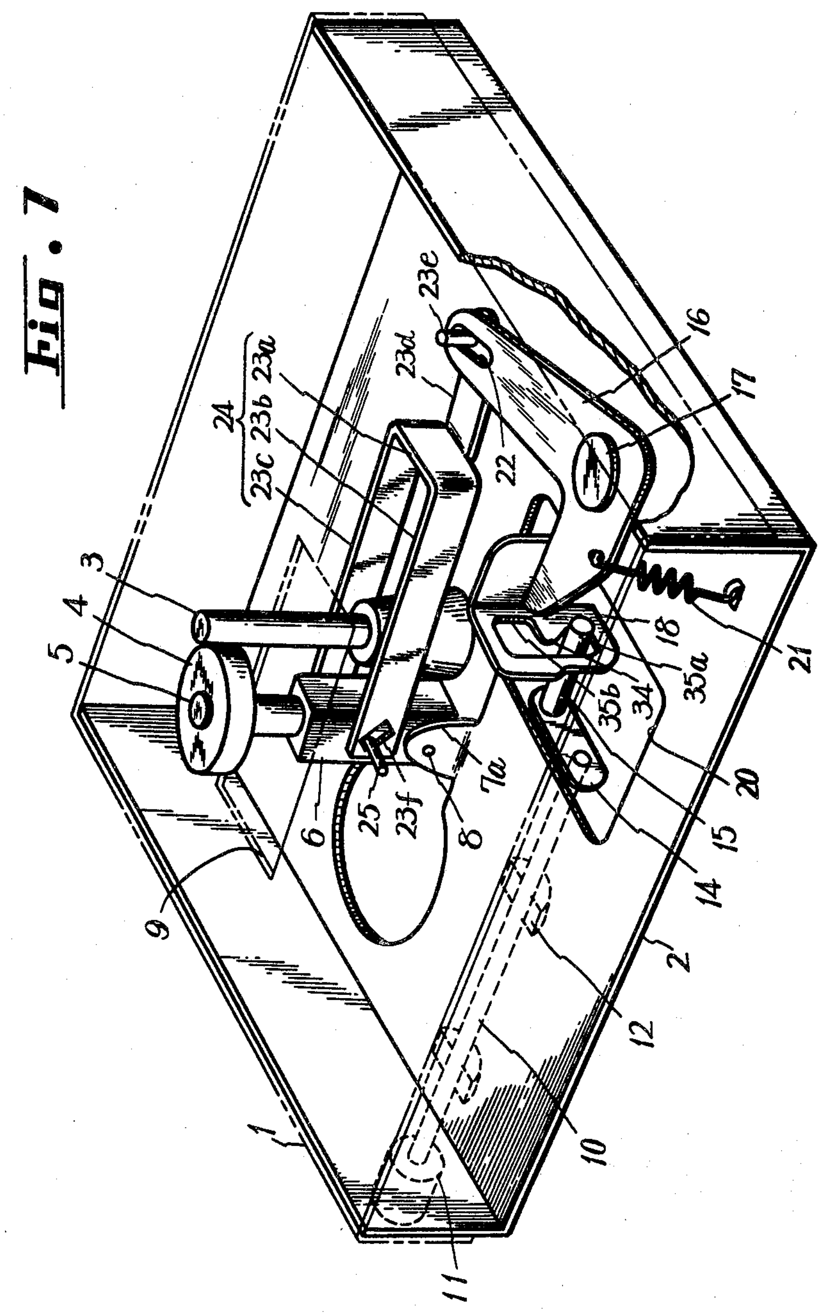
FIGURE 7 is a perspective view illustrating another example of the device according to this invention.

FIGURE 7 illustrates another example of this invention, in which two cam faces 35_a_ and 35_b_ divided by a projection 34 are formed in place of the taper 19 of the lever 16 shown in FIGURE 4 and the pin 15 of the arm 14 shown in FIGURE 4 is engaged with these cam faces 35_a_ and 35_b_. That is, when the pin 15 engages with one cam face 35_a_ the lever 16 rotates in the direction of the dotted line arrow to bring the pinch roller 4 in contact with the capstan 3, and when the pin 15 engages with the other cam face 35_b_ the lever 16 turns in the direction of the solid line arrow thereby to bring the pinch roller 4 out of contact with the capstan 3. To facilitate a better understanding of this example, other parts corresponding to those in FIGURE 1 are designated at the same numeral references.

Figure 8:
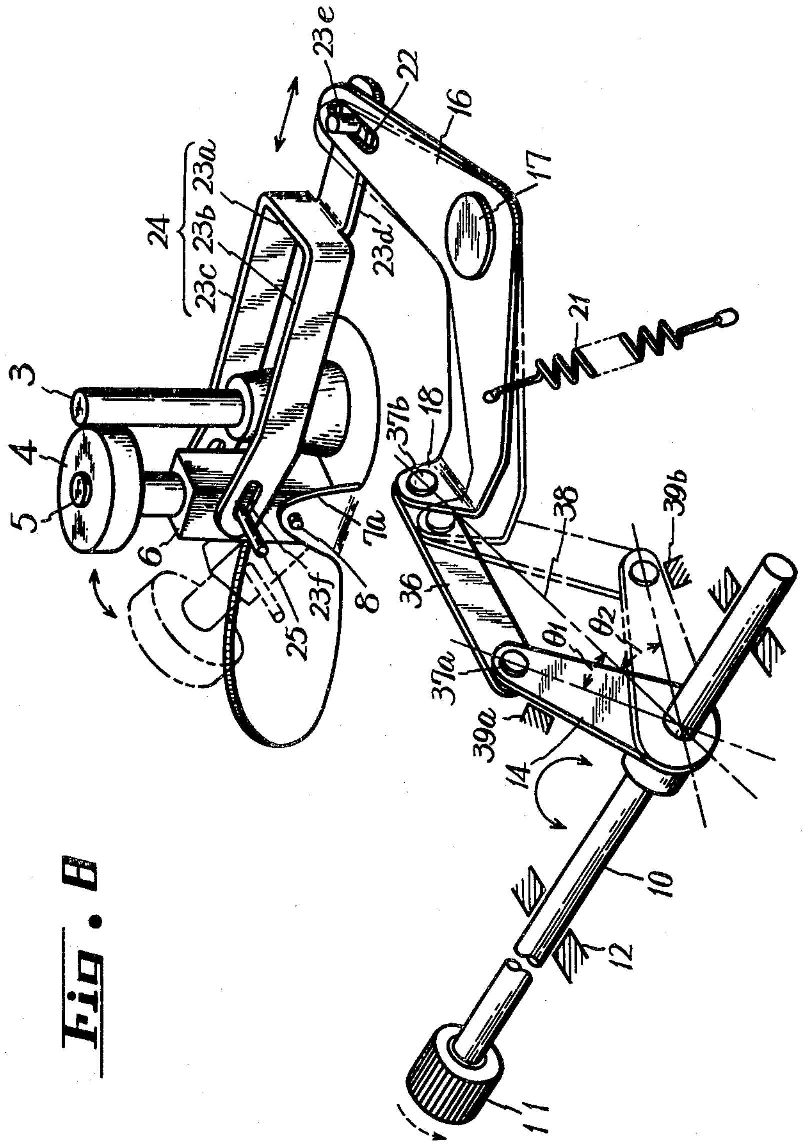
FIGURE 8 is a perspective view also illustrating another example of the device of this invention.

FIGURE 8 illustrates another example of this invention, in which a bent portion 18 of the free end of the lever 16 shown in FIGURE 4 and one free end of the arm 14 are connected by a connecting rod 36 and the pinch roller 4 is engaged with or disengaged from the capstan 3 according as the pin 37_a_ having pivoted thereto the arm 14 and the connecting rod 36 lies above or below the line 38 joining the pin 37_b_ having pivoted thereto the lever 16 and the connecting rod 36 and the rotary shaft 10. 39_a_ and 39_b_ are stoppers for the arm 14. Accordingly, when the knob 11 is turned in the direction of the full line arrow, the pin 37_a_ is brought down across the line 38 and the lever 16 turns in the direction of the solid line arrow thereby to disengage the pinch roller 4 from the capstan 3. Turning the knob 11 in the direction of the dotted line arrow, the pin 37_a_ is raised across the line 38 to engage the pinch roller 4 with the capstan 3. It is a matter of course in this case that the rotary angle $\theta_1$ of the pin 37_a_ to the line 38 is selected to be greater than $\theta_2$. In short, this is an example in which the pinch roller 4 is engaged with or disengaged from the capstan 3 by making use of the toggle action of the arm 14 and the connecting rod 36 due to the spring 21.

It will be apparent that many modifications and variations may be effected without departing from the scope of the novel concepts of this invention.

What is claimed is:

1. A pinch roller operating device for a magnetic tape recorder comprising a rotary actuating shaft having a knob at one end, said knob being arranged on the front panel of said recorder, said front panel having other electrical adjusting knobs disposed thereon, a rotary arm attached to said rotary actuating shaft on the other end thereof, a lever pivoted to the chassis of said recorder, one end of said lever being engaged with said rotary arm so as to be rotated thereby, an operating rod arranged substantially in parallel to said rotary actuating shaft, one end of said operating rod being engaged with the other end of said lever to be reciprocated thereby, a capstan, and a pinch roller, the shaft of said pinch roller being pivoted to a stationary part of the chassis of said recorder, said pinch roller shaft having a pin fixed thereto at an upper point of said pivoted point of said pinch roller shaft, said operating rod having a groove which is formed obliquely to the longitudinal direction of said operating rod for receiving said pin of said pinch roller shaft, said pinch roller being raised or lowered to engage with or disengage from said capstan in accordance with the reciprocating movement of said operating rod due to rotation of said knob.

2. A pinch roller operating device for a magazine-type magnetic tape recorder comprising a rotary actuating shaft having a knob at one end, said knob being arranged on the front panel of said recorder, said front panel having other electrical adjusting knobs disposed thereon, a rotary arm attached to said rotary actuating shaft on the other end thereof, a rotary lever pivoted to the chassis of said recorder and having a pin on its one end, the other end of said rotary lever being engageable with one end of said rotary arm, means to lock the rotary lever and the rotary arm in their engaged position, a spring provided between said rotary actuating shaft and a stationary part for rotating said rotary actuating shaft toward an operating position wherein said rotary arm is unlocked from its engaged position with said rotary lever, a bias spring inserted between a stationary part and said rotary lever for biasing said rotary lever in the engaged position with said rotary arm, said rotary lever being adapted to be rotated against said bias spring by a magazine to unlock said rotary lever from the engaged position with said rotary arm when said magazine is loaded in said recorder and pushed against said pin of said rotary lever, a lever pivoted to the chassis one end of which is engaged with the other end of said rotary arm so as to be rotated thereby, an operating rod having a fork-shaped end portion and arranged substantially in parallel to said rotary actuating shaft, the end opposite said fork-shaped end portion of said operating rod being engaged with the other end of said lever to be reciprocated thereby, a capstan, a pinch roller having a shaft which is pivoted to a stationary part of the chassis of said recorder, said pinch roller shaft having a pin fixed thereto at an upper point of said pivoted point of said pinch roller shaft, said operating rod having formed a groove in its fork-shaped end portion which is oblique to the longitudinal direction of said operating rod for receiving said pinch roller shaft pin, said pinch roller being raised or lowered to engage with or disengage from said capstan in accordance with the reciprocating movement of said operating rod due to rotation of said knob, and means provided on said other end of said lever in connection with said one end of said operating rod for adjusting the pressure of said pinch roller against said capstan.

3. A pinch roller operating device for a magazine-type magnetic tape recorder as claimed in claim 2, wherein said lever is substantially L-shaped, one end of said L-shaped lever having a taper, and a pin fixed to said rotary arm at said other end, said pin of said rotary arm being engaged with said taper of said L-shaped lever to control the rotation of said L-shaped lever.

4. A pinch roller operating device for a magazine-type magnetic tape recorder as claimed in claim 2, wherein a pin is fixed to said operating rod at the opposite end from said fork-shaped end portion, said pin being engaged with a groove formed in said lever, and spring means provided between a stationary part and said lever for biasing said lever and said pin to bring said pinch roller to the disengaged position.

5. A pinch roller operating device for a magazine-type magnetic tape recorder as claimed in claim 2, wherein means are provided for slidably receiving said magazine, said means having a window through which said pinch roller passes.

6. A pinch roller operating device for a magazine-type magnetic tape recorder as claimed in claim 4, wherein said means for adjusting the pressure of said pinch roller against said capstan includes a spring means disposed on the other end of said lever, said spring means for adjusting the pressure exerted on said pin fixed to said lever.

References Cited

UNITED STATES PATENTS

| | | | |
|---|---|---|---|
| 2,876,005 | 3/1959 | Eash | 242—55.19 |
| 3,023,943 | 3/1962 | Schober | 242—55.19 |
| 3,319,858 | 5/1967 | Schober et al. | 242—55.19 |

LEONARD FORMAN, *Primary Examiner.*

R. A. FIELDS, *Assistant Examiner.*